United States Patent [19]

Reed

[11] 3,894,257

[45] July 8, 1975

[54] MAGNETIC INDUCTION COUPLINGS

[75] Inventor: Jonathan Reed, Cambridge, England

[73] Assignee: Pye Limited, Cambridge, England

[22] Filed: Mar. 14, 1974

[21] Appl. No.: 451,149

[30] Foreign Application Priority Data

Mar. 23, 1973 United Kingdom ............... 14149/73
Dec. 10, 1973 United Kingdom ............... 57195/73

[52] U.S. Cl. .................................. 310/105; 310/268
[51] Int. Cl. ............................................ H02k 49/04
[58] Field of Search ....... 310/92, 93, 103, 104, 105, 310/106, 268, 166

[56] References Cited

UNITED STATES PATENTS 3,549,921 12/1970 Halstead et al. .................... 310/105

FOREIGN PATENTS OR APPLICATIONS 1,939,503 2/1970 Germany ........................... 310/105

*Primary Examiner*—Donovan F. Duggan
*Attorney, Agent, or Firm*—Brisebois & Kruger

[57] ABSTRACT

A magnetic induction coupling for transmitting torque from a driving shaft to a driven shaft comprises a first rotatable part of ferrmognetic material carrying a plurality of axially extending pole pieces, a second rotatable part comprising a disc of non-ferromagnetic material disposed opposite and axially spaced from said pole pieces and a stator of magnetic material having a portion disposed on the opposite side of said disc from said pole pieces. The stator includes or is connected to a region extending around the opposite side of said first rotatable part to said disc to define an airgap extending axially between said region and said first rotatable part and means are associated with said stator for producing a magnetic field which passes through said disc and said pole pieces and through said axial air gap.

7 Claims, 3 Drawing Figures

MAGNETIC INDUCTION COUPLINGS

The present invention relates to magnetic induction couplings for transmitting torque from a driving shaft to a driven shaft.

The invention provides a magnetic induction coupling comprising a first rotatable part of ferromagnetic material carrying a plurality of axially extending pole pieces, a second rotatable part comprising a disc of non-ferromagnetic material disposed opposite and axially spaced from said pole pieces, a stator of magnetic material having a portion disposed on the opposite side of said disc from said pole pieces and including or connected to a region extending around the opposite side of said first rotatable part to said disc to define an airgap extending axially between said region and said first rotatable part, and means associated with said stator for producing a magnetic field which passes through said disc and said pole pieces and through said axial airgap.

The induction coupling may comprise a second region of said stator extending around the periphery of said first rotatable part to define a further effective airgap extending radially between said second region and said periphery.

The means for producing a magnetic field may either be associated with the stator portion disposed on the opposite side of said disc to said pole pieces, or may be associated with the region of the stator on the opposite side of said pole pieces to said disc.

Figure 1:
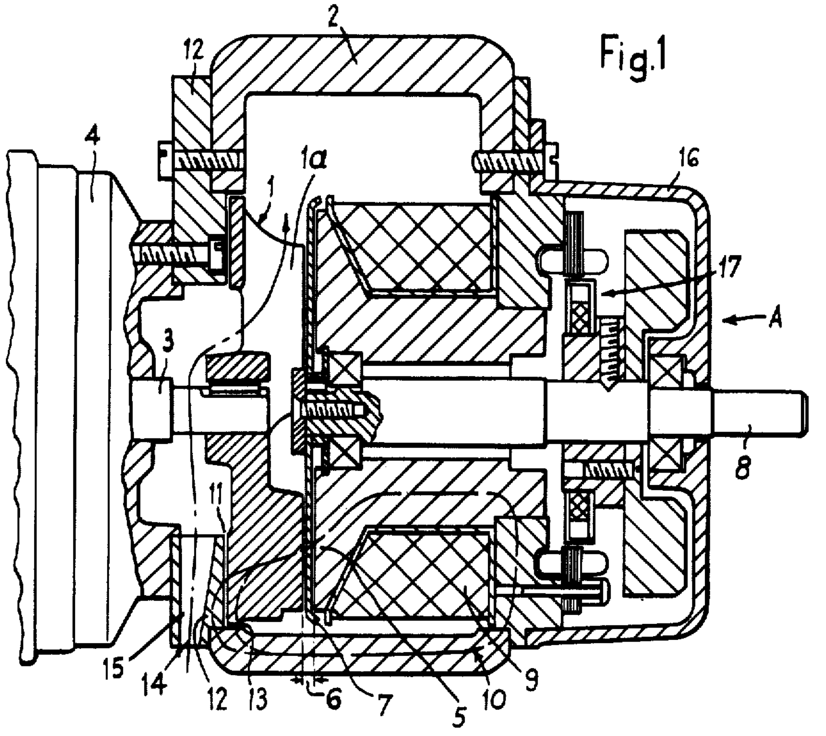
Figure 2:
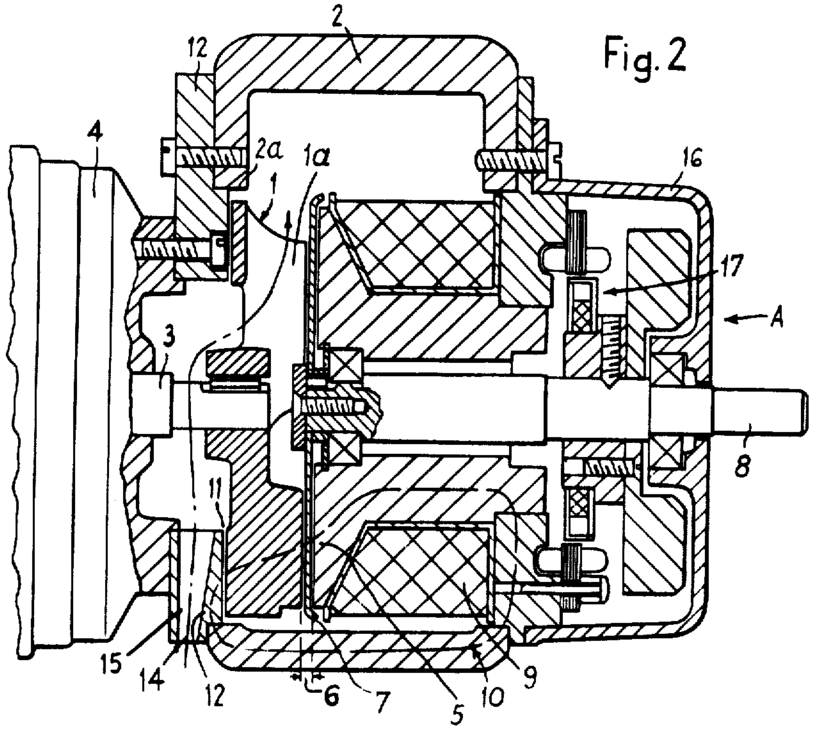
Figure 3:
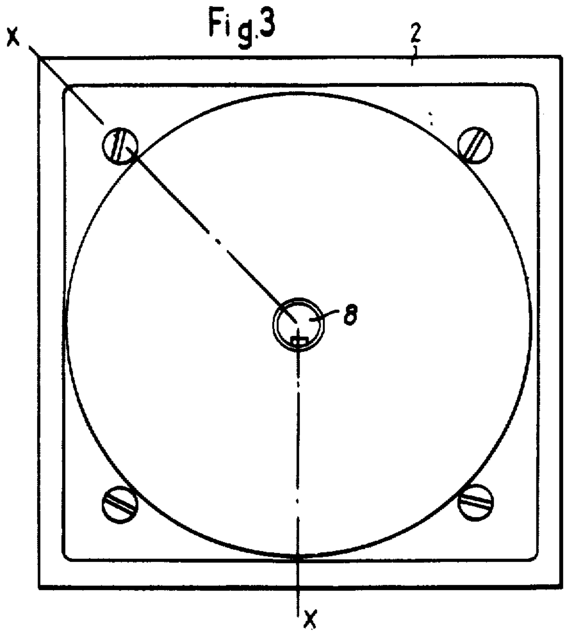

The invention will now be further described by way of example with reference to the accompanying drawings, in which:

FIG. 1 is a diagrammatic sectional view along the line X—X of FIG. 3 of one embodiment of induction coupling according to the invention, FIG. 2 is a similar view of a further embodiment, and FIG. 3 is an end view of either embodiment of coupling in the direction of arrow A in FIGS. 1 and 2, Referring to FIGS. 1 and 3, the induction coupling shown comprises a rotor 1 of ferromagnetic material mounted for rotation on the shaft 3 of a motor 4 which is attached to a part of a housing or casing 2 of ferromagnetic material. The housing or casing 2 contains the rotor 1 and forms part of the stator of the coupling. The rotor comprises a plurality of axially extending pole pieces 1*a* which face a stator portion 5 of magnetic material across an axial airgap 6. Three such pole pieces may be provided which may have a substantially triangular shape when viewed in the axial direction. A disc 7 of an electrically conductive non-magnetic material is mounted on a shaft 8 for rotation in the airgap 6. The disc may be made from any suitable non-magnetic material, such as copper, aluminium or an aluminium alloy. In this embodiment the shaft 8 is the output shaft but it will be understood that the coupling may be driven from either end.

A stationary energising coil 9 is mounted on the stator portion 5 which is connected to the housing or casing 2. When the coil 9 is energised, magnetic flux is set up as shown by the broken lines 10. This magnetic flux passes across the axial airgap 6 containing the disc 7, through the rotor pole pieces 1 which all have the same polarity, partly across an axial airgap 11 into a further portion 12 of the stator which projects radially behind the rotor 1, and partly across a radial airgap 13 into the housing or casing 2. From thence the flux path returns to the stator portion 5.

The proportions of the face area and length of the airgaps 6, 11 and 13 are so arranged that any axial pull between the rotor 1 and the stator portion 5 due to magnetism is balanced by the axial pull between the rotor 1 and the stator portion 12. The axial pull can either be eliminated or arranged to give a proportion of resultant pull in either direction. The coupling may be cooled by means of air entering the apertures 15 in the stator portion 12 and flowing between the pole pieces as shown by the chain dotted line 14. The stator portion 12 forms an end plate to which the motor 4 is secured.

Referring now to FIGS. 2 and 3, the embodiment to be described is basically similar to that of FIG. 1, and corresponding parts bear the same reference numerals. However, in this embodiment the housing 2 is cut back at 2*a* by a sufficient amount to eliminate the effect of the radial air gap 13 of FIG. 1, and the operative flux path 10*a*, indicated in broken lines, is through the main axial airgap 6 and the second axial airgap 11 into the stator portion 12. In this embodiment the proportions of the face area and length of the airgaps 6 and 11 are so arranged that any axial pull between the rotor 1 and the stator portion 5 due to magnetism can be balanced by axial pull between the rotor 1 and the stator portion 12. The resultant axial pull can be eliminated or adjusted as in the embodiment of FIG. 1.

Both embodiments of induction coupling described above also include a tachometer generator 17 contained within a cover 16 attached to the housing 2.

If desired, the stator portion 2 can be made of several separate parts, or be slotted or apertured to assist ventilation of the coupllings. Moreover since the overall shape of the stator portion 2 defining the outer casing of the coupling is other than circular, much greater flexibility in the design of the stator can be achieved.

Moreover the energising coil in the various embodiments may be replaced by a permanent magnet or magnets.

I claim:

1. A magnetic induction coupling comprising a first rotatable part of ferromagnetic material carrying a plurality of axially extending pole pieces, a second rotatable part comprising a disc of non-ferromagnetic material disposed opposite and axially spaced from said pole pieces, a stator of magnetic material having a portion disposd on the opposite side of said disc from said pole pieces and including or connected to a region extending around the opposite side of said first rotatable part to said disc to define an airgap extending axially between said region and said first rotatable part, means associated with said stator for producing a magnetic field which passes through said disc and said pole pieces and through said axial airgap and wherein the proportions of the face area and length of said axial airgap and of the further axial airgap containing said disc are such that any axial pull due to magnetism between the first rotatable part and said stator portion is balanced by axial pull due to magnetism between said first rotatable part and said region.

2. An induction coupling as claimed in claim 1, further comprising a second region of said stator extending around the periphery of said first rotatable part to define a further effective air gap extending radially between said second region and said periphery.

3. An induction coupling as claimed in claim 1, wherein said first rotatable part is provided with pole pieces of substantially triangular cross-section when viewed in the axial direction.

4. An induction coupling as claimed in claim 1, in which the means for producing the magnetic field is associated with said portion of the stator disposed on the opposite side of said disc from said pole pieces.

5. An induction coupling as claimed in claim 1, in which the means for producing the magnetic field comprises one or more energising coils suported by the stator.

6. An induction coupling as claimed in claim 1, wherein said stator region extending on the opposite side of said first rotatable part to said disc includes apertures by means of which cooling air may be drawn into the coupling.

7. An induction coupling as claimed in claim 1, wherein the overall shape of the stator defining the outer casing of the coupling is generally rectangular.

* * * * *